United States Patent
Coleman

(10) Patent No.: US 9,552,313 B2
(45) Date of Patent: Jan. 24, 2017

(54) DELIVERING REAL TIME INTERRUPTS WITH AN ADVANCED PROGRAMMABLE INTERRUPT CONTROLLER

(75) Inventor: James A. Coleman, Mesa, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 361 days.

(21) Appl. No.: 13/994,209

(22) PCT Filed: Dec. 28, 2011

(86) PCT No.: PCT/US2011/067518
§ 371 (c)(1),
(2), (4) Date: Jun. 14, 2013

(87) PCT Pub. No.: WO2013/100948
PCT Pub. Date: Jul. 4, 2013

(65) Prior Publication Data
US 2014/0195709 A1 Jul. 10, 2014

(51) Int. Cl.
*G06F 13/24* (2006.01)
*G06F 9/48* (2006.01)

(52) U.S. Cl.
CPC ............. *G06F 13/24* (2013.01); *G06F 9/4812* (2013.01)

(58) Field of Classification Search
CPC ........ G06F 9/48; G06F 9/4812; G06F 9/4818; G06F 9/4825; G06F 9/4831; G06F 13/24; G06F 13/26
See application file for complete search history.

(56) References Cited

U.S. PATENT DOCUMENTS

| | | | |
|---|---|---|---|
| 5,481,725 A * | 1/1996 | Jayakumar et al. | 710/48 |
| 5,745,772 A * | 4/1998 | Klein | 710/266 |
| 6,192,442 B1 * | 2/2001 | Haren et al. | 710/269 |
| 6,253,304 B1 | 6/2001 | Hewitt et al. | |
| 6,990,669 B1 | 1/2006 | Ballantyne | |
| 7,209,994 B1 | 4/2007 | Klaiber et al. | |
| 7,707,341 B1 | 4/2010 | Klaiber et al. | |
| 2002/0078121 A1 | 6/2002 | Ballantyne | |
| 2005/0198601 A1 * | 9/2005 | Kuang et al. | 716/6 |
| 2005/0251806 A1 * | 11/2005 | Auslander et al. | 718/100 |
| 2006/0015668 A1 * | 1/2006 | Nguyen et al. | 710/269 |
| 2007/0157197 A1 | 7/2007 | Neiger et al. | |
| 2008/0114916 A1 * | 5/2008 | Hummel et al. | 710/266 |
| 2011/0040913 A1 * | 2/2011 | Chung et al. | 710/264 |
| 2011/0197003 A1 * | 8/2011 | Serebrin et al. | 710/267 |

(Continued)

FOREIGN PATENT DOCUMENTS

TW 201140435 A 11/2011
WO 2013100948 A1 7/2013

OTHER PUBLICATIONS

"ARM PrimeCell™ Vectored Interrupt Controller (PL192) Technical Reference Manual". 2002. ARM Limited. ARM DDI 0273A.*

(Continued)

*Primary Examiner* — Thomas J Cleary
(74) *Attorney, Agent, or Firm* — Nicholson De Vos Webster & Elliott LLP

(57) ABSTRACT

Embodiments of apparatuses and methods for delivering real time interrupts with an APIC are disclosed. In one embodiment, an apparatus includes a local advanced programmable interrupt controller including a storage location to store a non-maskable interrupt vector.

20 Claims, 3 Drawing Sheets

(56) References Cited

U.S. PATENT DOCUMENTS

2013/0080673 A1* 3/2013 Feehrer et al. ............... 710/268

OTHER PUBLICATIONS

"Quartus II Handbook Version 9.1 vol. 5: Embedded Peripherals". Nov. 2009. Altera Corporation. Chapter 29 'Vectored Interrupt Controller Core'. pp. 29-1-29-20.*
International Preliminary Report on Patentability received for International Application No. PCT/US2011/067518, mailed on Jul. 10, 2014, 6 pages.
International Search Report and Written Opinion received for International Application No. PCT/US2011/067518, mailed on Sep. 21, 2012, 9 pages.
Cortex™-R4 and Cortex-R4F, Revision: r1p4, Technical Reference Manual, Copyright © 2006-2011, pp. 3-16 to 3-19, 5 pages.
"Office Action Received for Taiwanese Patent Application No. 101149833, mailed on Mar. 21, 2016, 7 Pages of Taiwanese Office Action and 8 Pages of English Translation."

* cited by examiner

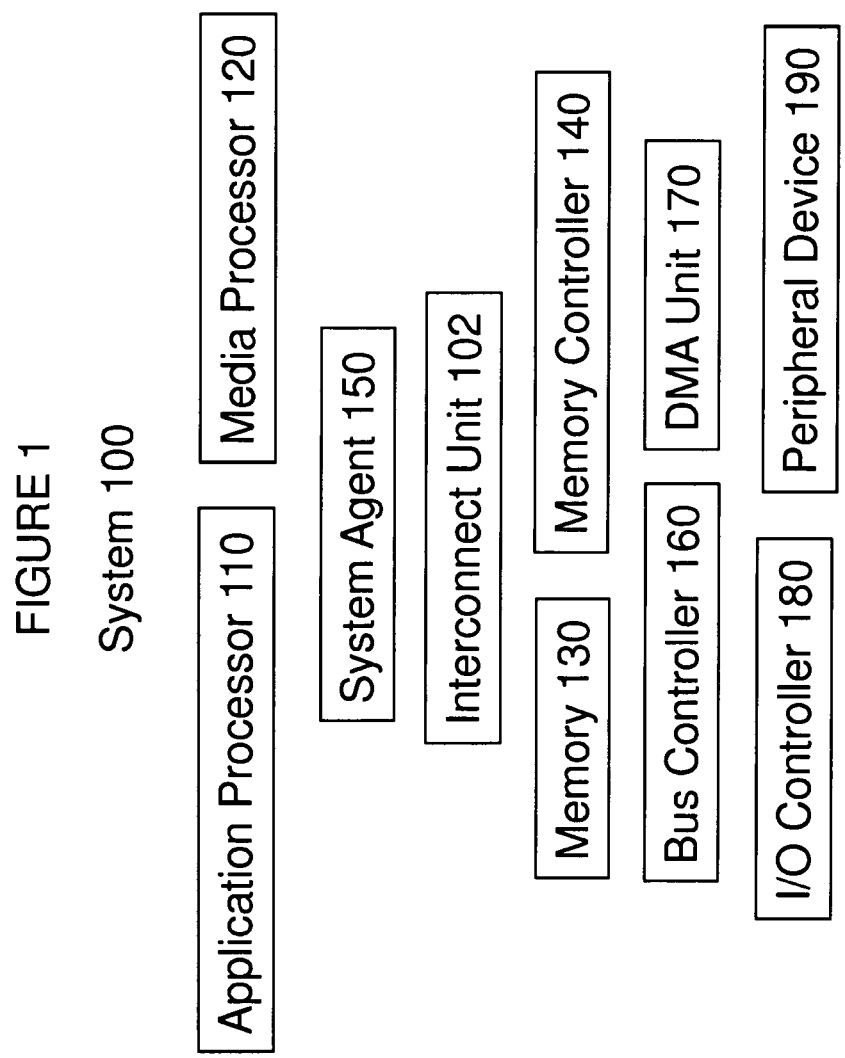

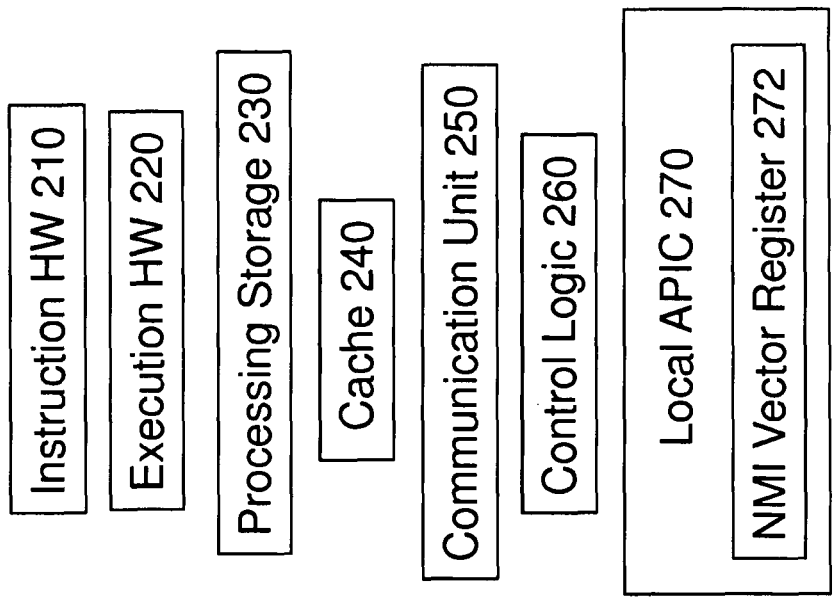

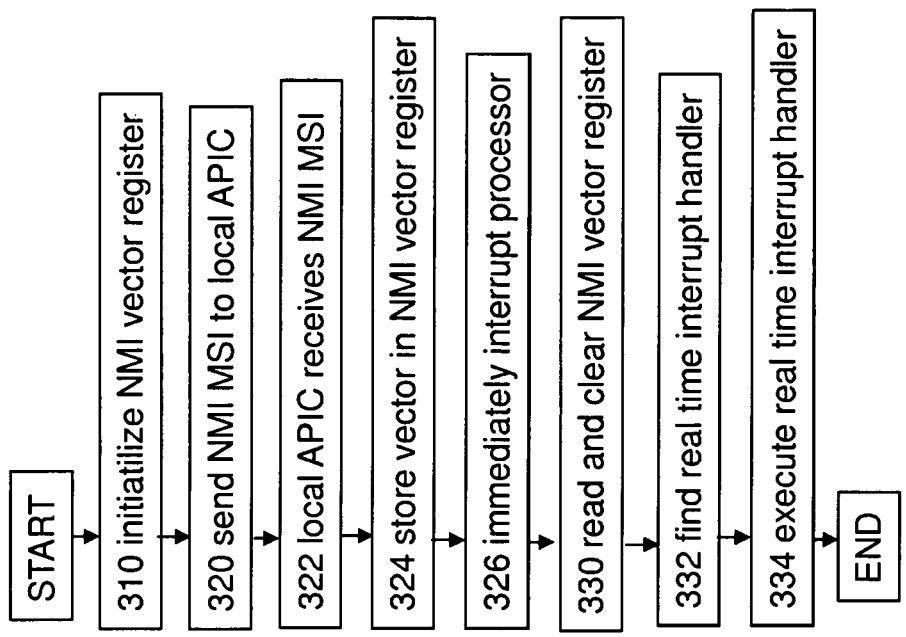

DELIVERING REAL TIME INTERRUPTS WITH AN ADVANCED PROGRAMMABLE INTERRUPT CONTROLLER

BACKGROUND

1. Field

The present disclosure pertains to the field of information processing, and more particularly, to the field of managing interrupts in information processing systems.

2. Description of Related Art

Many personal computer and other information processing systems manage interrupts according to Intel® Corporation's Advanced Programmable Interrupt Controller ("APIC") architecture or an interrupt architecture based on the APIC architecture. One or more processors in such a system may include a local APIC, and the system may include one or more input/output ("I/O") APICs.

BRIEF DESCRIPTION OF THE FIGURES

The present invention is illustrated by way of example and not limitation in the accompanying figures.

FIG. 1 illustrates a system in which an embodiment of the present invention may be present and/or operate.

FIG. 2 illustrates a processor supporting delivery of real time interrupts with an APIC according to an embodiment of the present invention.

FIG. 3 illustrates a method for delivery of real time interrupts with an APIC according to an embodiment of the present invention.

DETAILED DESCRIPTION

Embodiments of processors, methods, and systems for delivery of real time interrupts using an APIC are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

A system architecture using an APIC does not support guaranteed interrupt servicing latency, in other words, a maximum delay between the time I/O devices request service to when the processor begins executing the interrupt service routines ("ISRs"). This feature, which may be desired in a microcontroller-based system, may be provided by embodiments of the present invention.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system.

System 100 includes application processor 110, media processor 120, memory 130, memory controller 140, system agent unit 150, bus controller 160, direct memory access ("DMA") unit 170, input/output controller 180, and peripheral device 190. Systems embodying the present invention may include any or all of these components or other elements, and/or any number of each component or other element, and any number of additional components or other elements. Multiple instances of any component or element may be identical or different (e.g., multiple instances of an application processor may all be the same type of processor or may be different types of processors). Any or all of the components or other elements in any system embodiment may be connected, coupled, or otherwise in communication with each other through interconnect unit 102, which may represent any number of buses, point-to-point, or other wired or wireless connections.

Systems embodying the present invention may include any number of these elements integrated onto a single integrated circuit (a "system on a chip" or "SOC"). Embodiments of the present invention may be desirable in a system including an SOC because an SOC may be used in an embedded or other system in which real-time servicing of interrupts may be important.

Application processor 110 may represent any type of processor, including a general purpose microprocessor, such as a processor in the Core® Processor Family, or other processor family from Intel Corporation, or another processor from another company, or any other processor for processing information according to an embodiment of the present invention. Application processor 110 may include any number of execution cores and/or support any number of execution threads, and therefore may represent any number of physical or logical processors, and/or may represent a multi-processor component or unit.

Media processor 120 may represent a graphics processor, an image processor, an audio processor, a video processor, and/or any other combination of processors or processing units to enable and/or accelerate the compression, decompression, or other processing of media or other data.

Memory 130 may represent any static or dynamic random access memory, semiconductor-based read only or flash memory, magnetic or optical disk memory, any other type of medium readable by processor 110 and/or other elements of system 100, or any combination of such mediums. Memory controller 140 may represent a controller for controlling access to memory 130 and maintaining its contents. System agent unit 150 may represent a unit for managing, coordinating, operating, or otherwise controlling processors and/or execution cores within system 100, including power management.

Communication controller 160 may represent any type of controller or unit for facilitating communication between components and elements of system 100, including a bus controller or a bus bridge. Communication controller 160 may include one or more I/O APICs, which may be used to receive interrupt requests from I/O and peripheral devices for delivery to processor(s) 110. Communication controller 160 may also include other system logic to provide system level functionality such as a clock and system level power management, or such system logic may be provided elsewhere within system 100.

DMA unit 170 may represent a unit for facilitating direct access between memory 130 and non-processor components or elements of system 100. I/O controller 180 may represent a controller for an I/O or peripheral device, such as a keyboard, a mouse, a touchpad, a display, audio speakers, or an information storage device, according to any known dedicated, serial, parallel, or other protocol, or a connection to another computer, system, or network. Peripheral device 190 may represent any type of I/O or peripheral device, such as a keyboard, a mouse, a touchpad, a display, audio speakers, or an information storage device.

FIG. 2 illustrates processor 200, which may represent application processor 110 in FIG. 1, according to an embodiment of the present invention. Processor 200 may include instruction hardware 210, execution hardware 220, processing storage 230, cache 240, communication unit 250, control logic 260, and local APIC 270, with any combination of multiple instance of each.

Instruction hardware 210 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 220. Execution hardware 220 may include any circuitry, structure, or other hardware, such as an arithmetic unit, logic unit, floating point unit, shifter, etc., for processing data and executing instructions, micro-instructions, and/or micro-operations.

Processing storage 230 may represent any type of storage usable for any purpose within processor 200, for example, it may include any number of data registers, instruction registers, status registers, other programmable or hard-coded registers or register files, data buffers, instruction buffers, address translation buffers, branch prediction buffers, other buffers, or any other storage structures. Cache 240 may represent any number of level(s) of a cache hierarchy including caches to store data and/or instructions and caches dedicated per execution core and/or caches shared between execution cores.

Communication unit 250 may represent any circuitry, structure, or other hardware, such as an internal bus, an internal bus controller, an, external bus controller, etc., for moving data and/or facilitating data transfer among the units or other elements of processor 200 and/or between processor 200 and other system components and elements.

Control logic 260 may represent microcode, programmable logic, hard-coded logic, or any other type of logic to control the operation of the units and other elements of processor 200 and the transfer of data within processor 200. Control logic 260 may cause processor 200 to perform or participate in the performance of method embodiments of the present invention, such as the method embodiments described below, for example, by causing processor 200 to execute instructions received by instruction hardware 210 and micro-instructions or micro-operations derived from instructions received by instruction hardware 210.

Local APIC 270 may represent one or more local APICs (e.g., one local APIC per processor), each an interrupt controller according to the APIC architecture, including and/or with the exception of the novel features of embodiments of the present invention. In this embodiment, local APIC 270 includes non-maskable interrupt ("NMI") vector register 272, which may be any register or other storage location within or accessible to local APIC 270, including a register within the address space of the known APIC programming model. NMI vector register 272 may be of any size, in one embodiment, it has at least enough bit locations to hold an interrupt vector of a desired length.

According to the known APIC architecture, an NMI may be sent to a local APIC by the assertion of the NMI input or by a message signaled interrupt ("MSI"). The MSI may be a message on a system bus or an APIC bus, sent with a delivery mode value equal to the value specified for NMI (e.g., '100'). According to the known approach, the vector sent with an NMI MSI is ignored. Sending an NMI to a local APIC will result in the processor immediately being interrupted so it may call the NMI handler to handle the interrupt.

In contrast to other interrupt requests, an NMI is not masked, for example, by the IF flag in the EFLAGS register in the APIC programming model.

According to embodiments of the present invention, NMI vector register 272 may be used to store a vector for any interrupt handler, providing for any interrupt handler to be called in response to an NMI, not just the NMI handler. The vector may be sent with the NMI MSI, for example, in the field used for the vector of a maskable interrupt. Therefore, system software may be written to respond to an NMI by reading NMI vector register 272 for a vector for a real time interrupt handler. If system software finds a default value (e.g., zero) in NMI vector register 272, then it may continue according to the known approach of using the NMI vector to find the NMI handler. However, if a non-zero value is read from NMI vector register 272, system software may use it to find the real time interrupt handler. NMI vector register 272 may be cleared when read, to return its contents to the default value until another real time NMI message is received.

FIG. 3 illustrates method 300 for delivering real time interrupts with an APIC according to an embodiment of the present invention. The description of FIG. 3 may refer to elements of FIGS. 1 and 2 but method 300 and other method embodiments of the present invention are not intended to be limited by these references.

In box 310, NMI vector register 272 is initialized to a default value (e.g., zero) that is used to indicate that the NMI vector should be used to find the interrupt handler.

In box 320, an NMI MSI is sent to local APIC 270. The message may be sent with a delivery mode value equal to the value specified for NMI (e.g., '100'), and with a vector of a handler for a real time interrupt source in the vector field, by any interrupt source in system 100. In box 322, local APIC 270 receives the NMI MSI. In box 324, local APIC 270 stores the vector in NMI vector register 272. In box 326, processor 200 is immediately interrupted.

In box 330, system software reads NMI vector register 272, which clears it. In box 332, system software uses the vector to find the real time interrupt handler. In box 334, the real time interrupt handler is executed.

Within the scope of the present invention, method 300 may be performed in a different order than that shown in FIG. 3, with illustrated boxes omitted, with additional boxes added, or with a combination of reordered, omitted, or additional boxes.

Thus, processors, methods, and systems for delivering real time interrupts with an APIC have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a local advanced programmable interrupt controller including a storage location to store a non-maskable interrupt vector.

2. The processor of claim 1, further comprising an interface to receive a message signaled interrupt.

3. The processor of claim 2, further comprising control logic to cause the processor to store, in the storage location, a vector from a vector field of the message signaled interrupt having a non-maskable interrupt delivery mode.

4. The processor of claim 2, further comprising control logic to cause the processor to be interrupted immediately in response to receiving the message signaled interrupt.

5. The processor of claim 3, wherein the control logic is also to cause the storage location to be cleared when read.

6. The processor of claim 2, wherein the message signaled interrupt is from a source connected to the processor in a system on a chip.

7. A method comprising:
receiving, by a local advanced programmable interrupt controller of a processor, a message signaled interrupt having a non-maskable interrupt delivery mode; and
storing a vector from a vector field of the message signaled interrupt.

8. The method of claim 7, wherein storing includes storing the vector in a non-maskable interrupt vector storage location associated with the local advanced programmable interrupt controller.

9. The method of claim 8, further comprising initializing the non-maskable interrupt vector location to zero.

10. The method of claim 7, further comprising interrupting a processor immediately in response to receiving the message signaled interrupt.

11. The method of claim 7, further comprising reading, by system software, the non-maskable interrupt storage location.

12. The method of claim 11, wherein reading includes clearing the non-maskable interrupt storage location.

13. The method of claim 11, further comprising using the vector to find a real time interrupt handler.

14. The method of claim 11, further executing a non-maskable interrupt handler if the value of the vector is zero.

15. A system comprising:
a real time interrupt source; and
a processor including a local advanced programmable interrupt controller including a storage location to store a non-maskable interrupt vector.

16. The system of claim 15, further comprising an interface to send a message signaled interrupt from the real time interrupt source to the local advanced programmable interrupt controller.

17. The system of claim 16, further comprising control logic to cause the processor to store, in the storage location, a vector from a vector field of the message signaled interrupt having a non-maskable interrupt delivery mode.

18. The system of claim 16, further comprising control logic to cause the processor to be interrupted immediately in response to receiving the message signaled interrupt.

19. The system of claim 17, wherein the control logic is also to cause the storage location to be cleared when read.

20. The system of claim 16, wherein the real time interrupt source and the processor are a single chip.

* * * * *